Jan. 23, 1962 — D. A. MARSH — 3,017,662
PROCESS CONTROL SYSTEM
Filed May 6, 1959 — 2 Sheets-Sheet 1

INVENTOR.
D.A. MARSH
BY Hudson & Young
ATTORNEYS

Jan. 23, 1962   D. A. MARSH   3,017,662
PROCESS CONTROL SYSTEM
Filed May 6, 1959   2 Sheets-Sheet 2

INVENTOR.
D. A. MARSH
BY
Hudson & Young
ATTORNEYS

United States Patent Office 3,017,662
Patented Jan. 23, 1962

3,017,662
PROCESS CONTROL SYSTEM
Donald A. Marsh, Bartlesville, Okla., assignor to Phillips Petroleum Company, a corporation of Delaware
Filed May 6, 1959, Ser. No. 811,366
9 Claims. (Cl. 18—1)

This invention relates to the control of apparatus employed to pellet granular material. In another aspect it relates to motor control systems.

It is common practice to pellet granular material in order that the material can more easily be transported and processed. One important application of such a process occurs in carbon black production. Carbon black, as normally produced, is a low density powder which is extremely difficult to handle. However, the black can be formed into pellets which are more easily transported and processed. A wet pelleting system has recently been developed which provides a pelleted black that is harder and more stable than pelleted blacks previously made by dry pelleting processes. Wet pellets are formed by agitating loose black and a pelletizing liquid in a series of conveyors which shape and polish the pellets. The resulting pellets are then dried and conveyed to suitable storage or bagging facilities.

In a process of this type there is always the danger of failure of some piece of equipment in the process line. If such a failure occurs, it is important that the process line be stopped as soon as possible in order to avoid a buildup of material in the system and serious damage to the equipment. The present invention provides a safety control system for such a pelleting process wherein all pieces of equipment upstream from a point of failure are stopped automatically. In the event of such a failure, rotation of the dryer is continued even after the other equipment is stopped in order to avoid warpage.

Accordingly, it is an object of this invention to provide a control system for use in a pelleting process.

Another object is to provide a control system for operating a series of electric motors.

Other objects, advantages and features of the invention should become apparent from the following detailed description which is taken in conjunction with the accompanying drawing in which.

Figure 1:
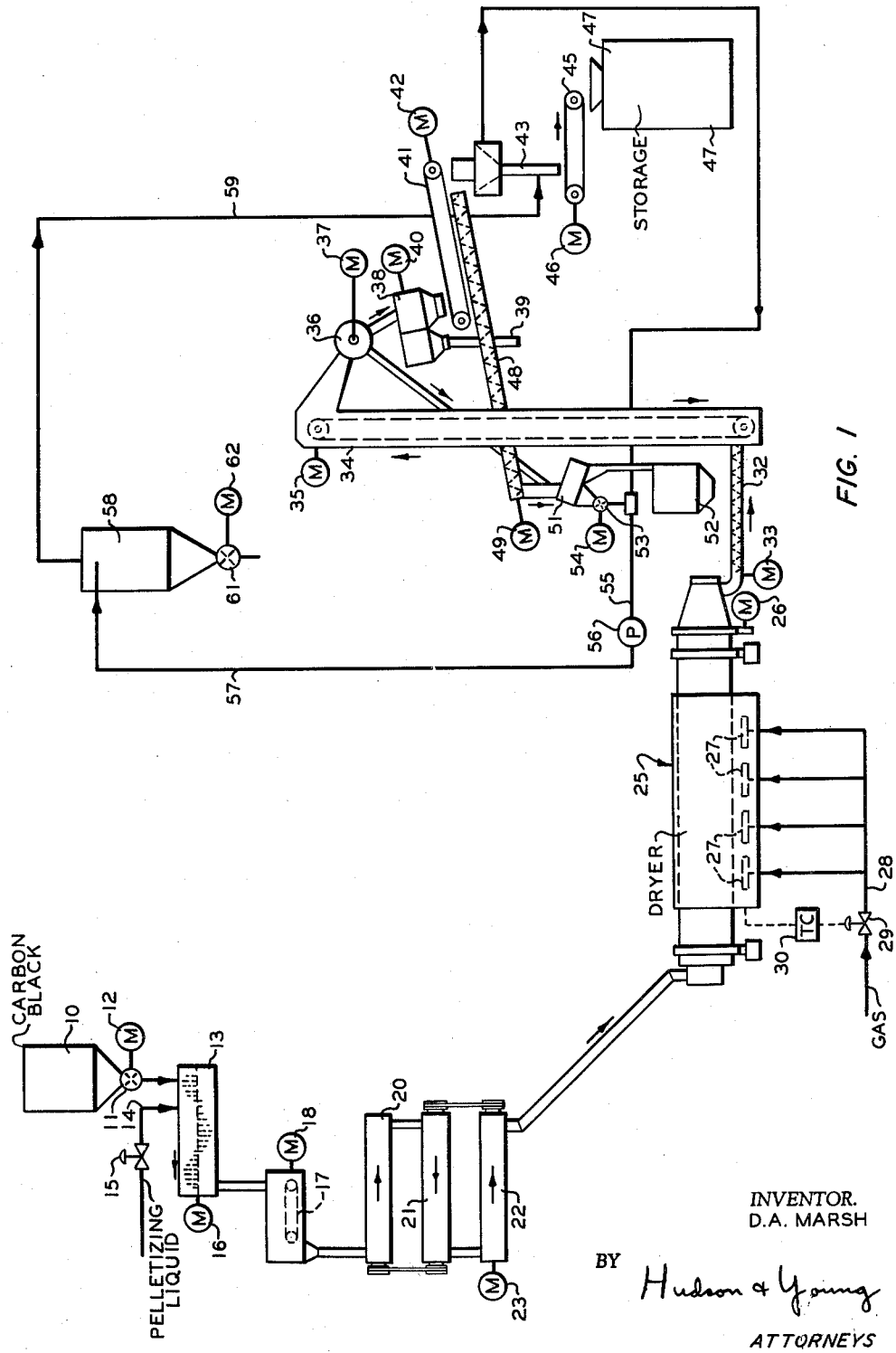
FIGURE 1 is a schematic representation of a wet pelleting system for carbon black.

Referring now to the drawing in detail and to FIGURE 1 in particular, the loose carbon black to be pelleted is supplied from a hopper 10. The loose black is directed from hopper 10 by a conveyor 11, which is actuated by a motor 12, to a wet mixing conveyor 13. A pelletizing liquid, which can be a 1.5 weight percent solution of molasses in water, for example, is supplied to conveyor 13 by a conduit 14 which has a control valve 15 therein. Approximately equal amounts by weight of pelletizing liquid and loose black are supplied to conveyor 13. Mixing conveyor 13 is provided with a central shaft that is rotated by a motor 16. A series of pins on the shaft serve to mix the black and liquid to form pellets. These pellets are discharged onto a weighing belt 17 which is driven by a motor 18. Weighing belt 17 provides a signal representative of the weight of pellets transported, which signal can regulate conveyor 11 so that pellets are delivered by belt 17 at a uniform rate. The pellets drop from belt 17 into the first of three agitating conveyors 20, 21 and 22 which are connected in series and driven by a common motor 23. These conveyors result in final shaping, polishing and densification of the pellets.

The wet pellets, which contain approximately 50 percent moisture, are fed into a rotary dryer 25 which is driven by a motor 26. Dryer 25 is provided with a series of burners 27 which are supplied with gas from a conduit 28. A control valve 29 in conduit 28 is regulated by a temperature controller 30 so that the gas supply is shut off in the event the temperature within dryer 25 exceeds a predetermined value. Hot gases are forced through dryer 25 by a blower, not shown, to facilitate drying of the pellets.

The pellets are dried to a moisture content of less than one percent and delivered to the inlet of a conveyor 32 which is actuated by a motor 33. Conveyor 32 delivers the pellets to the bottom of a bucket elevator 34 which is driven by a motor 35. The pellets discharged from the top of elevator 34 pour over a drum magnet 36 which is rotated by a motor 37. Magnet 36 removes any traces of magnetic grit. The pellets are then fed into a rotary screen 38 wherein oversize pellets are removed through a conduit 39. Screen 38 is rotated by a motor 40. A pellet conveyor 41, which is driven by a motor 42, delivers the pellets to an elutriator 43 which discharges onto a conveyor 45 that is driven by a motor 46. Belt 45 delivers the pellets to a storage container 47.

A reject system collects off-specification and spilled pellets from a screw conveyor 48 which is positioned beneath belt 41. A motor 49 drives conveyor 48 to deliver the black to a rotary screen 51. The discharge from magnetic drum 36 is also delivered to rotary screen 51. The oversize particles are discharged from screen 51 into a hopper 52. The product pellets from screen 51 are delivered by a conveyor 53, which is actuated by a motor 54, to a conduit 55 which communicates with the inlet of a blower 56. The outlet of blower 56 is connected by a conduit 57 to the inlet of a cyclone separator 58. The overhead gases from separator 58 are delivered by a conduit 59 to elutriator 43 and back to the inlet of blower 56. The carbon black removed by separator 58 is discharged through a conveyor 61 which is actuated by a motor 62.

Figure 2:
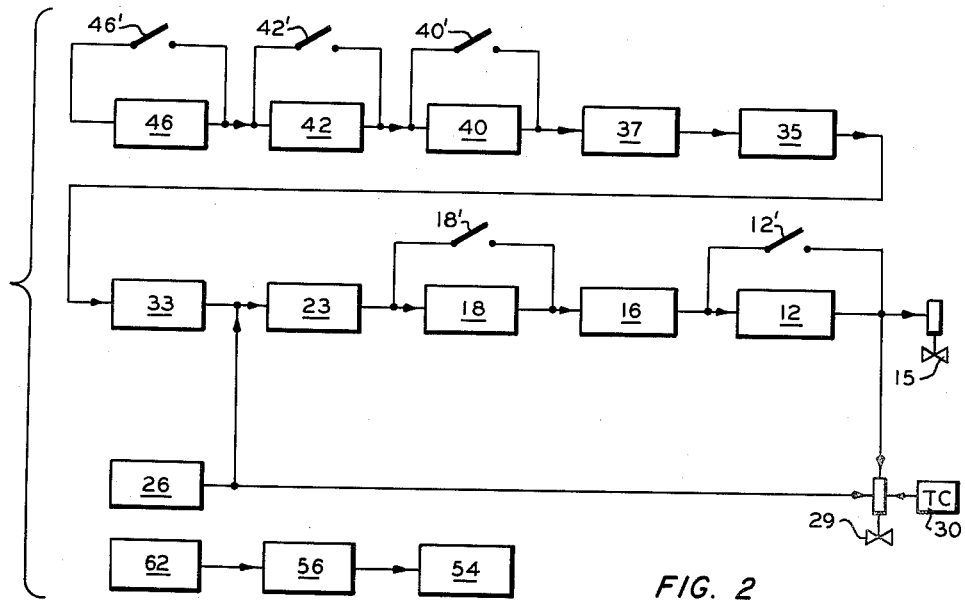
FIGURE 2 is a schematic drawing of the motor control system employed in conjunction with the apparatus of FIGURE 1.

As can be seen from FIGURE 1, all of the processing equipment is actuated by electric motors. In accordance with this invention, these motors are connected to one another in such a manner that all of the equipment upstream is shut down in the event of failure of any individual piece of equipment. The connections between the motors are illustrated schematically in FIGURE 2. As can be seen, motor 46 drives the last piece of equipment in the process line. In the event motor 46 should fail, motor 42 is turned off. Similarly, failure of motor 42 results in motor 40 being turned off. This sequence proceeds in series through motors 37, 35, 33, 23, 18, 16 and 12. It should be noted that motor 26 is not included in this sequence. It is important that rotation of dryer 25 not be terminated until the dryer is cooled down to a safe temperature. However, failure of motor 26 results in motors 23, 18, 16 and 12 being turned off in sequence. Failure of motor 62 turns off blower 56 and motor 54 in sequence. When motor 12 is turned off, valves 15 and 29 are closed. Similarly, valve 29 is closed when motor 26 is turned off. As previously discussed, valve 29 is also closed if the temperature of the dryer exceeds a predetermined value.

Figure 3:
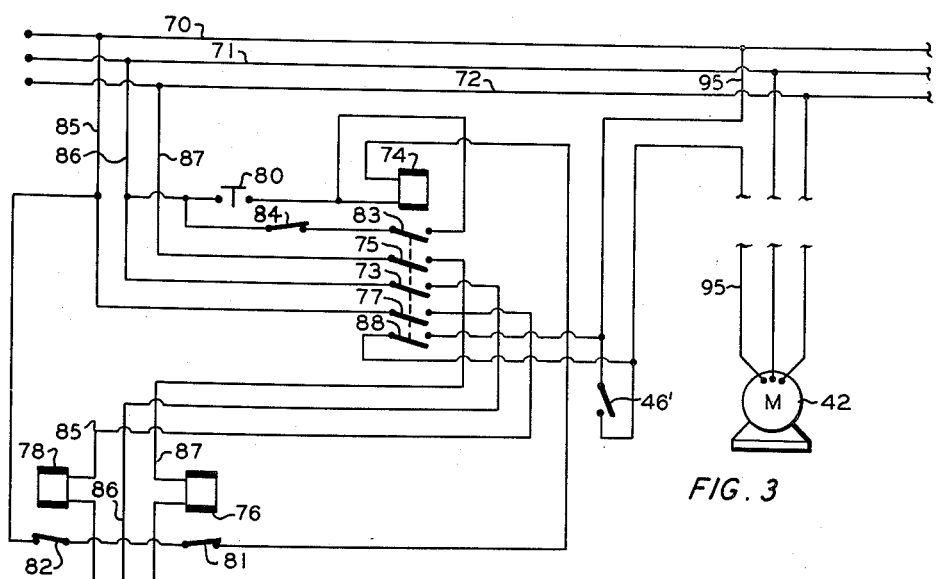
FIGURE 3 is a detailed schematic circuit drawing of a portion of the motor control system.

The actuating and control system of motor 46 is illustrated in detail in FIGURE 3. Electrical power for motor 46 is supplied by lines 70, 71 and 72. Line 71 is connected to the first terminal of motor 46 by a line 86 which has a switch 73 therein which is closed when a relay coil 74 is energized. Line 72 is connected to the second terminal of motor 46 by a line 87 which has a switch 75 and a relay coil 76 therein connected in series relationship. Line 70 is connected to the third terminal of motor 46 by a line 85 which has a switch 77 and a relay coil 78 therein connected in series relationship. Switches 75 and 77 are also closed when relay coil 74 is energized. Line 71 is connected to line 70 through a switch 80, relay coil 74 and switches 81 and 82 which are connected in series relationship. Closure of switch 80 results in relay 74 being energized so that switches 75, 73 and 77 are closed to energize motor 46. This is the normal procedure to be followed in starting the motor. A switch 83, which is closed when relay coil 74 is energized, is connected in parallel with switch 80 through a switch 84 so that relay coil 74 remains energized after switch 80 is closed momentarily to start the motor.

Relay coils 76 and 78 are selected so that respective switches 81 and 82 remain closed during normal operation of the motor. In the event one of the windings in the motor should burn out, an excessive current will flow through one of the relays 76 and 78 to cause this relay to be energized. Opening of either switch 81 or switch 82 deenergizes relay coil 74 so that the motor is turned off.

Motor 42 is connected to power leads 70, 71 and 72 by a control system, not shown, which is substantially identical to the one associated with motor 46. However, the control system of motor 42 includes additional elements. Line 95, which corresponds to line 85 of motor 46, is connected through a switch 88 which is closed when relay coil 74 is energized. Thus, motor 42 can not be operated unless motor 46 is operating by relay 74 being energized. Similarly, motor 40 is controlled by motor 42 by a corresponding circuit. The remaining motors are likewise connected in sequence.

It is sometimes desirable during manual operation to energize a motor on a particular piece of equipment when the upstream equipment is not operating. This can be accomplished by by-pass switches 46', 42', 40', 18' and 12' which are associated with respective motors 46, 42, 40, 18 and 12. Switch 46' is illustrated in FIGURE 3 as being connected in parallel with switch 88. If switch 46' is closed, motor 42 can be operated even if motor 46 is not operating.

As previously discussed, motor 23 is turned off if either motor 33 or motor 26 fails to operate. The switches of motors 33 and 26 which correspond to switch 88 of motor 46 are thus connected in series relationship in the line of motor 23 which corresponds to line 95 of motor 42.

Figure 4:
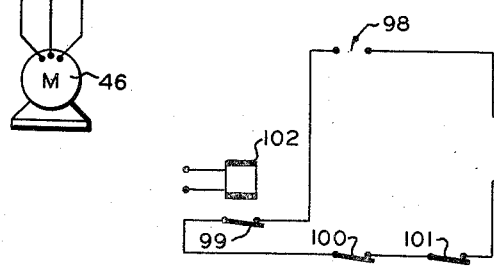
FIGURE 4 is a schematic circuit drawing of the valve control system.

The control system of valve 29 is illustrated schematically in FIGURE 4. Valve 29 is normally retained open by a solenoid 97 being energized from a current source 98 through switches 99, 100 and 101. Switches 100 and 101 correspond to switches of respective motors 26 and 12 which correspond to switch 88 of motor 46. If the temperature of the dryer exceeds a predetermined value, controller 30 provides a signal which energizes a relay 102 to open switch 99. Thus, valve 29 is closed if any one of the switches 99, 100 or 101 is opened.

The control system of this invention provides a simple and positive means for shutting down the carbon black pelleting process in the event of a failure of any piece of equipment. All of the equipment upstream from the point of failure is shut down in sequence to terminate the flow of carbon black pellets through the system. The equipment downstream from the point of failure normally continues to operate until all of the carbon black is delivered to the storage facilities. If desired, warning indicators can be associated with any or all of the motors to provide the operators with signals that the motors have been turned off.

While the invention has been described in conjunction with a present preferred embodiment, it should be evident that it is not limited thereto.

What is claimed is:

1. Pelleting apparatus comprising a mixing conveyor driven by a first motor; a second conveyor driven by a second motor to deliver material to be pelleted to said mixing conveyor; means to introduce a pelleting liquid into said mixing conveyor; a rotary dryer driven by a third motor; first conveyor means driven by a fourth motor to deliver pellets to said dryer; a weighing conveyor driven by a fifth motor to deliver pellets from said mixing conveyor to said first conveyor means; second conveyor means driven by a sixth motor to remove pellets from said dryer; means responsive to rotation of said sixth motor being terminated to stop said fourth, fifth, first and second motors in sequence; and means responsive to rotation of said third motor being terminated to stop said fourth, fifth, first and second motors in sequence.

2. Pelleting apparatus comprising a mixing conveyor driven by a first motor; a second conveyor driven by a second motor to deliver material to be pelleted to said mixing conveyor; means to introduce a pelleting liquid into said mixing conveyor; a rotary dryer driven by a third motor; first conveyor means driven by a fourth motor to deliver pellets to said dryer; a weighing conveyor driven by a fifth motor to deliver pellets from said mixing conveyor to said first conveyor means; second conveyor means driven by a sixth motor to remove pellets from said dryer; means responsive to rotation of any one of said sixth, fifth, first and second motors being terminated to stop the remainder thereof in the sequence named; and means responsive to rotation of said third motor being terminated to stop said fourth, fifth, first and second motors in the sequence named.

3. The apparatus of claim 2 wherein said rotary dryer is supplied with fuel through a fuel conduit having a control valve therein; and further comprising temperature responsive means in thermal contact with said dryer; means responsive to said temperature responsive means to close said control valve when the temperature of said dryer exceeds a predetermined value; means responsive to rotation of said second motor being terminated to close said control valve; and means responsive to rotation of said third motor being terminated to close said control valve.

4. The apparatus of claim 2 wherein said means to introduce a pelleting liquid has a control valve therein, and means responsive to rotation of said second motor being terminated to close said control valve.

5. The apparatus of claim 2 wherein each of said motors is connected to a source of electrical energy by three power leads having first, second and third switches therein, respectively; a control lead connected between two of said power leads, said control lead having fourth, fifth and sixth switches and a first relay coil connected in series relationship, said first relay coil closing said first, second and third switches when energized; second and third relay coils in two of said power leads, respectively, said second and third relay coils closing said fifth and sixth switches, respectively, when energized; and a seventh switch adapted to be closed when said first relay coil is energized, said seventh switch being connected in one of the power leads of another motor, the rotation of which is terminated by termination of rotation of the described motor.

6. Pelleting apparatus comprising a mixing conveyor driven by a first motor; a second conveyor driven by a second motor to deliver material to be pelleted to said mixing conveyor; means to introduce a pelleting liquid into said mixing conveyor; a rotary dryer driven by a third motor; a rotary conveyor driven by a fourth motor to deliver pellets to said dryer; a weighing conveyor driven by a fifth motor to deliver pellets from said mixing conveyor to said rotary conveyor; a first belt conveyor driven by a sixth motor to deliver pellets to a storage facility; a second belt conveyor driven by a seventh motor to deliver pellets to said first belt conveyor; a screen separator driven by an eighth motor to deliver pellets to said second belt conveyor; a drum separator driven by a ninth motor to deliver pellets to said screen separator; an elevator driven by a tenth motor to deliver pellets to said drum separator; a third conveyor driven by an eleventh motor to transfer pellets from said dryer to said elevator; means responsive to rotation of any one of said sixth, seventh, eighth, ninth, tenth, eleventh, fourth, fifth, first and second motors being terminated to stop the remainder thereof in the sequence named; and means responsive to rotation of said third motor being terminated to stop said fourth, fifth, first and second motors in the sequence named.

7. The apparatus of claim 6 wherein said rotary dryer is supplied with fuel through a fuel conduit having a control valve therein; and further comprising temperature responsive means in thermal contact with said dryer; means responsive to said temperature responsive means to close said control valve when the temperature of said dryer exceeds a predetermined value; means responsive to rotation of said second motor being terminated to close said control valve; and means responsive to rotation of said third motor being terminated to close said control valve.

8. The apparatus of claim 6 wherein said means to introduce a pelleting liquid has a control valve therein, and means responsive to rotation of said second motor being terminated to close said control valve.

9. A method of controlling a pelleting operation wherein a material to be pelleted and a pelletizing liquid are fed to a pelletizing zone, and from said zone to a weighing conveyor zone and thence by way of a further conveying zone to a drying zone and then through a last conveying zone to remove pellets from said drying zone which comprises independently and automatically operating the following zones: a material feeding zone, a pelletizing zone, a weighing conveyor zone, a further conveying zone, a drying zone, and a last conveying zone to effect said operation; and whenever the operation of said last conveying zone is unavoidably interrupted, arresting, in the order here stated, the automatic operation of said further conveying zone, said weighing conveying zone, said pelletizing zone and the operation of said material feeding zone but continuing the operation of said drying zone, thus avoiding serious damage to said drying zone as by warpage due to local over-heating thereof.

References Cited in the file of this patent

UNITED STATES PATENTS

| | | |
|---|---|---|
| 2,304,382 | Shoeld | Dec. 8, 1942 |
| 2,457,962 | Whaley | Jan. 4, 1949 |
| 2,458,683 | Cowherd et al. | Jan. 11, 1949 |
| 2,699,381 | King | Jan. 11, 1955 |
| 2,801,826 | Stavnes et al. | Aug. 6, 1957 |
| 2,880,819 | King et al. | Apr. 7, 1959 |
| 2,940,593 | Remke et al. | June 14, 1960 |